US008429713B2

(12) United States Patent
Candelore et al.

(10) Patent No.: US 8,429,713 B2
(45) Date of Patent: Apr. 23, 2013

(54) METHOD AND APPARATUS TO SPEED TRANSMISSION OF CEC COMMANDS

(75) Inventors: Brant Candelore, San Diego, CA (US); Aravind Asam, San Diego, CA (US); Peter R Shintani, San Diego, CA (US); Robert Blanchard, Escondido, CA (US); Takashi Hironaka, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1395 days.

(21) Appl. No.: 11/695,359

(22) Filed: Apr. 2, 2007

(65) Prior Publication Data
US 2008/0244097 A1    Oct. 2, 2008

(51) Int. Cl.
*H04L 29/06*    (2006.01)
(52) U.S. Cl.
USPC ............... 726/3; 710/5; 713/168; 348/558; 370/254
(58) Field of Classification Search ...... 710/5; 713/168; 340/825.22; 348/553; 370/254
See application file for complete search history.

(56) References Cited

U.S. PATENT DOCUMENTS

| 6,028,937 | A   |   | 2/2000  | Tatebayashi et al. |          |
|-----------|-----|---|---------|--------------------|----------|
| 6,742,182 | B1  |   | 5/2004  | Perlman            |          |
| 7,135,985 | B2  | * | 11/2006 | Woolgar et al.     | 340/825.22 |
| 2003/0172272 | A1 |   | 9/2003  | Ehlers et al.      |          |
| 2003/0223377 | A1 | * | 12/2003 | Simmons et al.     | 370/254  |
| 2003/0236991 | A1 |   | 12/2003 | Letsinger          |          |
| 2006/0095596 | A1 | * | 5/2006  | Yung et al.        | 710/5    |
| 2007/0208939 | A1 | * | 9/2007  | Iwamoto et al.     | 713/168  |
| 2009/0290065 | A1 | * | 11/2009 | Asayama et al.     | 348/553  |

FOREIGN PATENT DOCUMENTS

| EP | 1027685 B1      | 3/2002 |
|----|-----------------|--------|
| WO | WO0172009 A2    | 9/2001 |
| WO | WO2004049621 A1 | 6/2004 |

OTHER PUBLICATIONS

Anderson, Michael D., USPTO Examiner, Final Office Action U.S. Appl. No. 11/695,477, Aug. 8, 2012.

* cited by examiner

*Primary Examiner* — Brandon Hoffman
*Assistant Examiner* — Michael D Anderson
(74) *Attorney, Agent, or Firm* — Miller Patent Services; Jerry A. Miller

(57) ABSTRACT

A method and structure for establishing faster transmission of Consumer Electronic Control (CEC) commands between first and second HDMI-compatible devices. The first and second devices may transmit CEC commands via a shared alternate interface, a signaling path distinct from a standard HDMI CEC interface between the first and second devices. Authentication may furthermore be performed prior to use of the alternate interface to confirm that the communication is authorized.

44 Claims, 7 Drawing Sheets

METHOD AND APPARATUS TO SPEED TRANSMISSION OF CEC COMMANDS

CROSS REFERENCE TO RELATED APPLICATIONS

This application is related to application Ser. No. 11/695,477, entitled, "AUTHENTICATION IN AN AUDIO/VISUAL SYSTEM HAVING MULTIPLE SIGNALING PATHS, filed even date herewith, which is hereby incorporated by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The invention relates generally to digital audio/visual communications. More particularly, the invention relates to a method and apparatus for improved and speeded transmission of CEC commands between HDMI-compatible devices.

BACKGROUND

High Definition Multimedia Interface (HDMI®) is a digital audio/visual connector interface capable of transmitting uncompressed and compressed streams, and can provide an interface between any compatible digital audio/video (A/V) source device, herein also referred to as a module, such as a set-top box (STB) or set-back box (SBB), a DVD player, a PC, a video game system, an A/V receiver, and a compatible digital audio and/or video monitor device, such as a television (TV) or a digital television (DTV). HDMI solves the problem of "too many cables" in A/V systems. Audio, visual, status and control information may be transmitted via one cable in the system Consumer Electronic Control (CEC) is a protocol used to control devices that are attached using HDMI. HDMI, such as HDMI 1.2a released in December 2005, supports CEC features, command sets, and CEC compliance tests. CEC features, as may be defined from time to time in the CEC Specification, include routing control, standby, system information, and feature abort. Other, optional features may include one touch recording, deck control, tuner control, On Screen Display (OSD) display, OSD name transfer, device menu control, RC pass-through, power status and vendor-specific commands. Of course, it is understood that the HDMI specification continues to be enhanced and enlarged and new CEC commands are expected to be added as developed.

Using a single cable, CEC control allows a user to control all HDMI devices with a remote control or commander user interface, including powering on or off connected devices and generally commands initiated by devices to other devices. It thus solves the problem of "too many remote controls or commanders." Consider an example of "one-touch play." A user can press play on one HDMI device, such as a DVD, and operation of CEC commands causes the A/V receiver to automatically turn on and switch to the correct input, which automatically turns on the TV; this in turn automatically switches to the correct input received from the A/V receiver.

In spite of these advantages, the HDMI CEC signal path from device to device is unacceptably slow. The bandwidth associated with the HDMI CEC specification is very low and the delay associated with data transfer rate is long, with the transfer rate, including ECC buffered memory and checksum, approximately 52 bytes per second. This standard CEC signal path of the HDMI connector is half duplex and slow, resulting in a sluggish remote control or commander user interface experienced by a user.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

Figure 1:
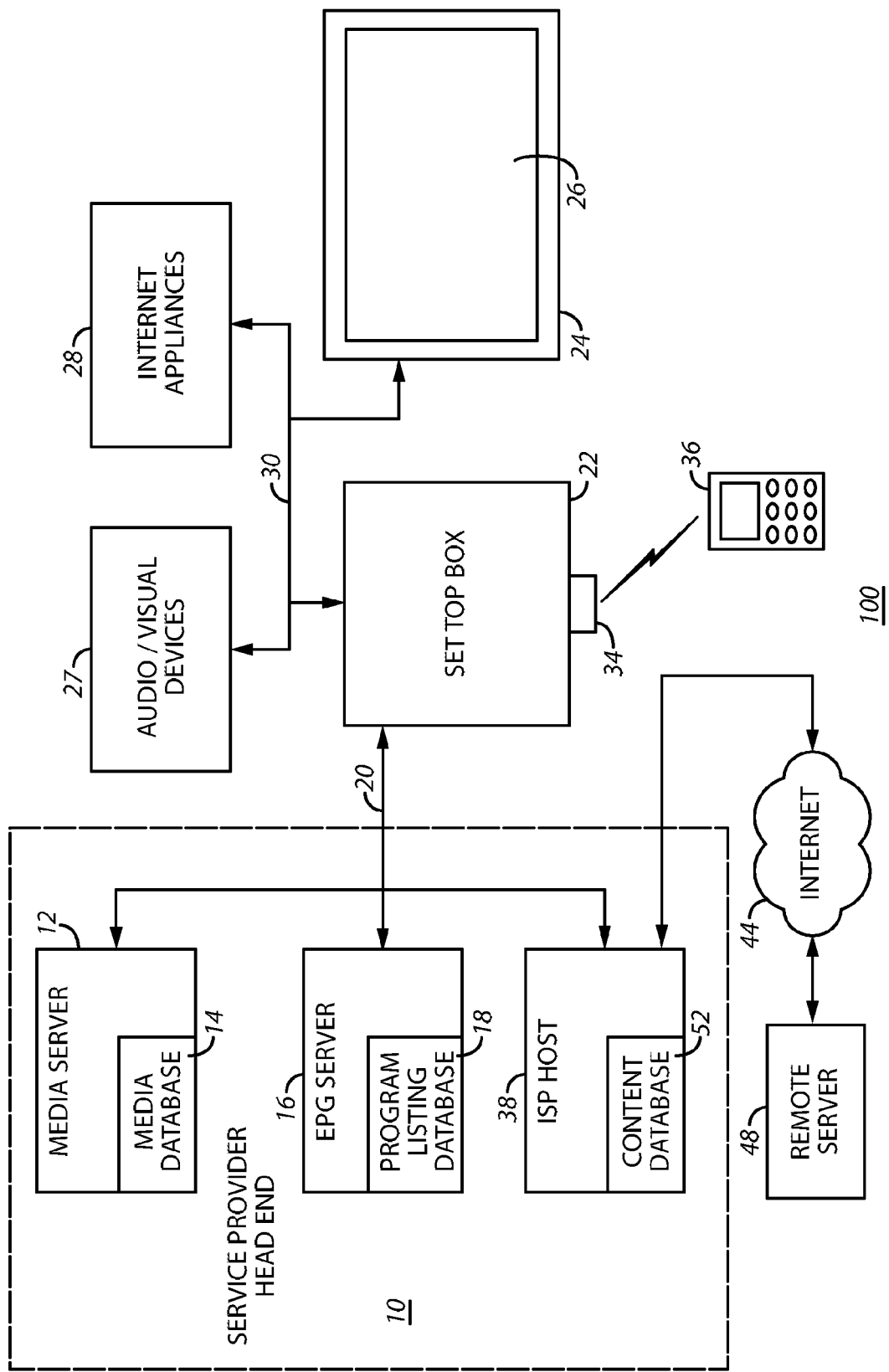
FIG. 1 is a system block diagram of a system using a set-top box.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method and structure operable for establishing faster transmission of Consumer Electronic Control (CEC) commands between first and second HDMI-compatible devices in accordance with various embodiments is described herein. The method includes confirming that the first and second devices share an authorized alternate interface for transmitting CEC commands, with the alternate interface being a signaling path distinct from a standard HDMI CEC interface between the first and second devices, and then transmitting CEC commands between the first and second devices over the alternate interface. Confirming that the devices actually share the alternate interface will point out problems such as there not being physical connection between the devices via the appropriate cable(s).

The alternate interface will be a faster signaling path for the transmittal of CEC commands between the two devices, although this is not necessarily required, as, for instance, the alternate interface may be used in conjunction with the standard CEC interface to provide two half-duplex communication interfaces in certain embodiments.

Authentication may be used to make sure that certain security and operational concerns are met, as will be discussed. Authentication may be used to make sure that the device or devices are permitted to be and actually are in communication via the enhanced alternate interface. Such is the case when the first device, for instance, is a TV and the second device is a module and authentication requires authenticating the module to verify that it is permitted to be used with the TV. The module may not be confirmed to share the alternate interface with the TV, for instance, if it cannot return a physical address to the TV (indicating, for example, that it is not connected to the interface). A physical address is a unique number that the module gets from the TV; therefore, the TV can use it to distinguish the module from other devices. Furthermore, the module may not be authenticated if its physical address does not match or otherwise reflect an expected value, or its vendor identification does not match that expected by the TV. Again, the module may be one or more of a set-top box, a set-back box, a DVD player, a PC, a video game system, and an A/V receiver.

Also in accordance with certain embodiments, CEC commands may be transmitted between first and second devices over a standard HDMI CEC interface and then following confirmation that the first and second devices share an alternate interface for transmitting CEC commands, CEC commands may be transmitted between the first and second devices over the alternate interface.

The authorized alternate interface may be an alternate signaling path within a HDMI connector connecting said first and second devices or it may be a USB signaling path. In the case of it being within the HDMI connector, the alternate signaling path within the HDMI connector may be an I$^2$C data channel of the HDMI connector. After switching over to the I$^2$C data channel, the standard HDMI CEC interface may no longer be used. The alternate signaling path within the HDMI connector may also be a reserved PIN in the HDMI connector if allowed by the CEC specification. In this instance, the alternate interface and the standard HDMI CEC interface may both be used, if desired, to transmit CEC commands between the first and second devices. In the case of the alternate interface being USB, the standard HDMI CEC interface need not be used.

The detailed operation of a module, in particular a STB or SBB, will be described herein. A module operable to interface with a television in an audio/visual system in accordance with certain embodiments will comprise a programmed processor; a software segment running on the programmed processor; a user interface software segment running on the programmed processor that receives user commands using the software segment; and a connector element. The module is operable to transmit CEC commands using an alternate interface coupled to the connector element, wherein the alternate interface is a signaling path distinct from a standard HDMI CEC interface. The software segment may be an Internet video player, such as Microsoft's Windows media player, a DVD player, an Internet browser, etc.

Referring to FIG. 1, a block diagram for an exemplary interactive cable or satellite television (TV) system 100 is shown. The system 100 includes, at a head end of the service provider 10, a media server 12 for providing, on demand, movies and other programming obtained from a media database 14. The media server 12 might also provide additional content such as interviews with the actors, games, advertisements, available merchandise, associated Web pages, interactive games and other related content. The system 100 also includes an electronic programming guide (EPG) server 16 and a program listing database 18 for generating an EPG. Set-top box 22 can generally provide for bidirectional communication over a transmission medium 20 in the case of a cable STB 22. In other embodiments, bidirectional communication can be effected using asymmetrical communication techniques possibly using dual communication media—one for the uplink and one for the downlink. In any event, the STB 22 can have its own Universal Resource Locator (URL) or IP address or other unique identifier assigned thereto to provide for addressability by the head end and users of the Internet.

The media server 12 and EPG server 16 are operatively coupled by transmission medium 20 to a set-top box (STB) 22. The transmission medium 20 may include, for example, a conventional coaxial cable network, a fiber optic cable network, telephone system, twisted pair, a satellite communication system, a radio frequency (RF) system, a microwave system, other wireless systems, a combination of wired and wireless systems or any of a variety of known electronic transmission mediums. In the case of a cable television network, transmission medium 20 is commonly realized at the subscriber's premises as a coaxial cable that is connected to a suitable cable connector at the rear panel of the STB 22. In the case of a Direct Satellite System (DSS), the STB 22 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 22.

The exemplary system 100 further includes a TV 24, such as a digital television, having a display 26 for displaying programming, an EPG, etc. The STB 22 may be coupled to the TV 24 and various other audio/visual devices 27 (such as audio systems, Personal Video Recorders (PVRs), Video Tape Recorders (VTRs), Video Cassette Recorders (VCRs) and the like), storage devices (e.g., hard disc drives) and Internet Appliances 28 (such as email devices, home appliances, storage devices, network devices, and other Internet Enabled Appliances) by an appropriate interface 30, which can be any suitable analog or digital interface. In one embodiment, interface 30 conforms to an interface standard such as the Institute of Electrical and Electronics Engineers (IEEE) 1394 standard, but could also be wholly or partially supported by a DVI interface (Digital Visual Interface-Digital Display Working Group, www.ddwg.org), HDMI or other suitable interface.

The STB 22 may include a central processing unit (CPU) such as a microprocessor and memory such as Random Access Memory (RAM), Read Only Memory (ROM), flash memory, mass storage such as a hard disc drive, floppy disc drive, optical disc drive or may accommodate other electronic storage media, etc. Such memory and storage media is suitable for storing data as well as instructions for programmed processes for execution on the CPU, as will be discussed later. Information and programs stored on the electronic storage media or memory may also be transported over any suitable transmission medium such as that illustrated as 20. STB 22 may include circuitry suitable for audio decoding and processing, the decoding of video data compressed in accordance with a compression standard such as the Motion Pictures Experts Group (MPEG) standard and other processing to form a controller or central hub. Alternatively, components of the STB 22 may be incorporated into the TV 24 itself, thus eliminating the STB 22. Further, a computer having a tuner device and modem may be equivalently substituted for the TV 24 and STB 22.

By way of example, the STB 22 may be coupled to devices such as a personal computer, video cassette recorder, camcorder, digital camera, personal digital assistant and other audio/visual or Internet related devices. In addition, a data transport architecture, such as that set forth by an industry group which includes Sony Corporation and known as the Home Audio-Video Interoperability (HAVi) architecture may be utilized to enable interoperability among devices on a network regardless of the manufacturer of the device. This forms a home network system wherein electronic devices and Internet appliances are compatible with each other. The STB 22 runs an operating system suitable for a home network system such as Sony Corporation's Aperios™. real time operating system. Other operating systems could also be used.

The STB 22 includes an infrared (IR) receiver 34 for receiving IR signals from an input device such as remote control or commander 36. Alternatively, it is noted that many other control communication methods may be utilized besides IR, such as wired or wireless radio frequency, etc. In addition, it can be readily appreciated that the input device 36 may be any device suitable for controlling the STB 22 such as a remote control or commander, personal digital assistant, laptop computer, keyboard or computer mouse. In addition, an input device in the form of a control panel located on the TV 24 or the STB 22 can be provided.

The STB 22 may also be coupled to an independent service provider (ISP) host 38 by a suitable connection including dial-up connections, DSL (Digital Subscriber Line) or the same transmission medium 20 described above (e.g., using a cable modem) to, thus, provide access to services and content from the ISP and the Internet. The ISP host 38 provides various content to the user that is obtained from a content database 52. STB 22 may also be used as an Internet access device to obtain information and content from remote servers such as remote server 48 via the Internet 44 using host 38 operating as an Internet portal, for example. In certain satellite STB environments, the data can be downloaded at very high speed from a satellite link, with asymmetrical upload speed from the set-top box provided via a dial-up or DSL connection.

While the arrangement illustrated in FIG. 1 shows a plurality of servers and databases depicted as independent devices, any one or more of the servers can operate as server software residing on a single computer. Moreover, although not explicitly illustrated, the servers may operate in a coordinated manner under centralized or distributed control to provide multiple services as a Multiple Service Operator (MSO) in a known manner. Additionally, the services provided by the servers shown in FIG. 1 may actually reside in other locations, but from the perspective of the user of STB 22, the service provider 10 serves as a portal to the services shown. Those skilled in the art will appreciate that the illustration of FIG. 1 represents a simplified depiction of a cable system configuration shown simply as service provider 10. The actual configuration of the service provider's equipment is more likely to follow a configuration defined by the CableLabs OpenCable™ specification. The simplified illustration shown is intended to simplify the discussion of the service provider 10's operation without unnecessarily burdening the discussion with architectural details that will be evident to those skilled in the art. Those details can be found in the publicly available CableLabs OpenCable™ specification or in the text "OpenCable Architecture (Fundamentals)" by Michael Adams, Cisco Press, November 1999.

Figure 2:
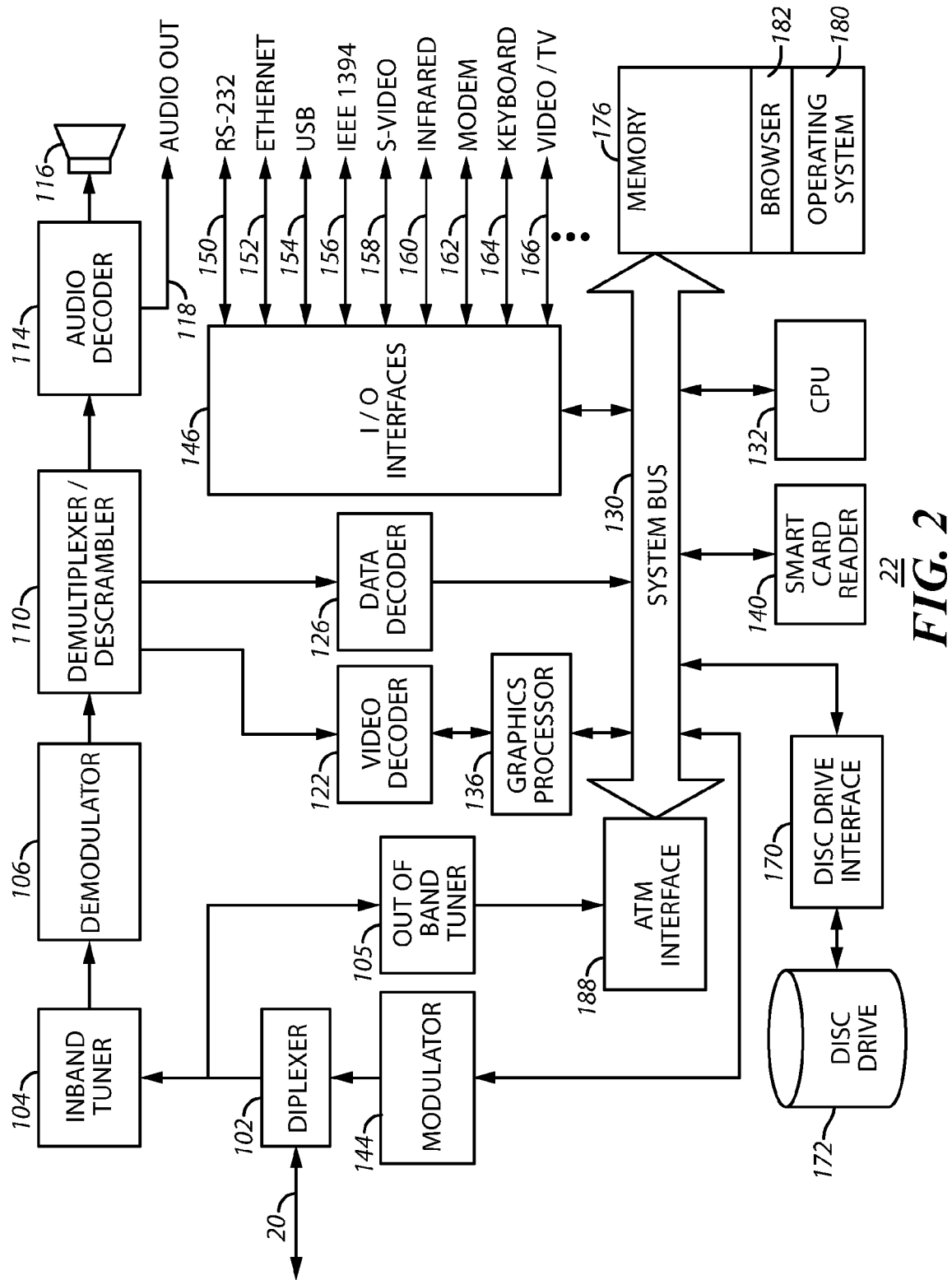
FIG. 2 is a functional block diagram of a digital set-top box suitable for use with the present invention.

Referring now to FIG. 2, a typical system configuration for a digital set-top box 22 is illustrated. In this exemplary set-top box, the transmission medium 20, such as a coaxial cable, is coupled by a suitable interface through a diplexer 102 to an in-band tuner 104. Tuner 104 may, for example, include a broadcast in-band tuner for receiving video content. An out-of-band (OOB) tuner 105 is provided for receiving data transmissions, including ATM formatted SI data. A return path through diplexer 102 provides an OOB return path for outbound data (destined for example for the head end). A separate tuner (not shown) may be provided to receive conventional RF broadcast television channels. Modulated information formatted, for example, as MPEG-2 information is then demodulated at a demodulator 106. The demodulated information at the output of demodulator 106 is provided to a demultiplexer and descrambler circuit 110 where the information is separated into discrete channels of programming. The programming is divided into packets, each packet bearing an identifier called a Packet ID (PID) that identifies the packet as containing a particular type of data (e.g., audio, video, data). The demodulator and descrambler circuit 110 also decrypts encrypted information in accordance with a decryption algorithm to prevent unauthorized access to programming content, for example.

Audio packets from the demultiplexer 110 (those identified with an audio PID) are decrypted and forwarded to an audio decoder 114 where they may be converted to analog audio to drive a speaker system (e.g., stereo or home theater multiple channel audio systems) or other audio system 116 (e.g., stereo or home theater multiple channel amplifier and speaker systems) or may simply provide decoded audio out at 118. Video packets from the demultiplexer 110 (those identified with a video PID) are decrypted and forwarded to a video decoder 122. In a similar manner, data packets from the demultiplexer 110 (those identified with a data PID) are decrypted and forwarded to a data decoder 126.

Decoded data packets from data decoder 126 are sent to the set-top box's computer system via the system bus 130. A central processing unit (CPU) 132 can thus access the decoded data from data decoder 126 via the system bus 130. Video data decoded by video decoder 122 is passed to a graphics processor 136, which is a computer optimized to processes graphics information rapidly. Graphics processor 136 is particularly useful in processing graphics intensive data associated with Internet browsing, gaming and multimedia applications such as those associated with MHEG (Multimedia and Hypermedia information coding Experts Group) set-top box applications. It should be noted, however, that the function of graphics processor 136 may be unnecessary in some set-top box designs having lower capabilities, and the function of the graphics processor 136 may be handled by the CPU 132 in some applications where the decoded video is passed directly from the demultiplexer 110 to a video encoder. Graphics processor 136 is also coupled to the system bus 130 and operates under the control of CPU 132.

Many set-top boxes such as STB 22 may incorporate a smart card reader 140 for communicating with a so called "smart card," often serving as a Conditional Access Module (CAM). The CAM typically includes a central processor unit (CPU) of its own along with associated RAM and ROM memory. Smart card reader 140 is used to couple the system bus of STB 22 to the smart card serving as a CAM (not shown). Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 22 can operate in a bidirectional communication mode so that data and other information can be transmitted not only from the system's head end to the end user, or from a service provider to the end user of the STB 22, but also, from the end user upstream using an out-of-band channel. In one embodiment, such data passes through the system bus 130 to a modulator 144 through the diplexer 102 and out through the transmission medium 20. This capability is used to provide a mechanism for the STB 22 and/or its user to send information to the head end (e.g., service requests or changes, registration information, etc.) as well as to provide fast outbound communication with the Internet or other services provided at the head end to the end user.

Set-top box 22 may include any of a plurality of I/O (Input/Output) interfaces represented by I/O interfaces 146 that permit interconnection of I/O devices to the set-top box 22. By way of example, and not limitation, a serial RS-232 port 150 can be provided to enable interconnection to any suitable serial device supported by the STB 22's internal software. Similarly, communication with appropriately compatible devices can be provided via an Ethernet port 152, a USB (Universal Serial Bus) port 154, an IEEE 1394 (so-called firewire™ or i-link™) or IEEE 1394 wide port 156, S-video port 158 or infrared port 160. Such interfaces can be utilized to interconnect the STB 22 with any of a variety of accessory devices such as storage devices, audio/visual devices 27, gaming devices (not shown), Internet Appliances 28, etc.

I/O interfaces 146 can include a modem (be it dial-up, cable, DSL or other technology modem) having a modem port 162 to facilitate high speed or alternative access to the Internet or other data communication functions. In one preferred embodiment, modem port 162 is that of a DOCSIS (Data Over Cable System Interface Specification) cable modem to facilitate high speed network access over a cable system, and port 162 is appropriately coupled to the transmission medium 20 embodied as a coaxial cable. Thus, the STB 22 can carry out bidirectional communication via the DOCSIS cable modem with the STB 22 being identified by a unique IP address. The DOCSIS specification is publicly available.

A PS/2 or other keyboard/mouse/joystick interface such as 164 can be provided to permit ease of data entry to the STB 22. Such inputs provide the user with the ability to easily enter data and/or navigate using pointing devices. Pointing devices such as a mouse or joystick may be used in gaming applications.

Of course, STB 22 also may incorporate basic video outputs 166 that can be used for direct connection to a television set such as 24 instead of (or in addition to) an IEEE 1394 connection such as that illustrated as 30. In one embodiment, Video output 166 can provide composite video formatted as NTSC (National Television System Committee) video. In some embodiments, the video output 166 can be provided by a direct connection to the graphics processor 136 or the demultiplexer/descrambler 110 rather than passing through the system bus 130 as illustrated in the exemplary block diagram. S-Video signals from output 158 can be similarly provided without passing through the system bus 130 if desired in other embodiments.

The infrared port 160 can be embodied as an infrared receiver 34 as illustrated in FIG. 1, to receive commands from an infrared remote control 36, infrared keyboard or other infrared control device. Although not explicitly shown, front panel controls may be used in some embodiments to directly control the operation of the STB 22 through a front panel control interface as one of interfaces 146. Selected interfaces such as those described above and others can be provided in STB 22 in various combinations as required or desired.

STB 22 will more commonly, as time goes on, include a disc drive interface 170 and disc drive mass storage 172 for user storage of content and data as well as providing storage of programs operating on CPU 132. STB 22 may also include floppy disc drives, CD ROM drives, CD R/W drives, DVD drives, etc. CPU 132, in order to operate as a computer, is coupled through the system bus 130 (or through a multiple bus architecture) to memory 176. Memory 176 may include a combination any suitable memory technology including Random Access Memory (RAM), Read Only Memory (ROM), Flash memory, Electrically Erasable Programmable Read Only Memory (EEPROM), etc.

While the above exemplary system including STB 22 is illustrative of the basic components of a digital set-top box suitable for use with the present invention, the architecture shown should not be considered limiting since many variations of the hardware configuration are possible without departing from the present invention. The present invention could, for example, also be implemented in more advanced architectures such as that disclosed in U.S. patent application Ser. No. 09/473,625, filed Dec. 29, 1999, entitled "Internet Set-Top Box Having and In-Band Tuner and Cable Modem" and issued as U.S. Pat. No. 6,757,909 on Jun. 29, 2004 to Jun Maruo and Atsushi Kagami.

This patent describes a set-top box using a multiple bus architecture with a high level of encryption between components for added security. This application is hereby incorporated by reference as though disclosed fully herein.

In general, during operation of the STB 22, an appropriate operating system 180 such as, for example, Sony Corporation's Aperios™ real time operating system is loaded into, or is permanently stored in, active memory along with the appropriate drivers for communication with the various interfaces. In other embodiments, other operating systems such as Microsoft Corporation's Windows CE™ could be used without departing from the present invention. Along with the operating system and associated drivers, the STB 22 usually operates using browser software 182 in active memory or may permanently reside in ROM, EEPROM or Flash memory, for example. The browser software 182 typically operates as the mechanism for viewing not only web pages on the Internet, but also serves as the mechanism for viewing an Electronic Program Guide (EPG) formatted as an HTML document. The browser 182 can also provide the mechanism for viewing normal programming (wherein normal programming is viewed as an HTML video window—often occupying the entire area of screen 26).

STB software architectures vary depending upon the operating system. However, in general, all such architectures generally include, at the lowest layer, various hardware interface layers. Next is an operating system layer as previously described. The software architectures of modern STB have generally evolved to include a next layer referred to as "middleware." Such middleware permits applications to run on multiple platforms with little regard for the actual operating system in place. Middleware standards are still evolving at this writing, but are commonly based upon Javascript and HTML (hypertext Markup Language) virtual machines. At the top layer is the application layer where user applications and the like reside (e.g., browsing, email, EPG, Video On Demand (VOD), rich multimedia applications, pay per view, etc.). The current invention can be utilized with any suitable set-top box software and hardware architecture.

Figure 3:
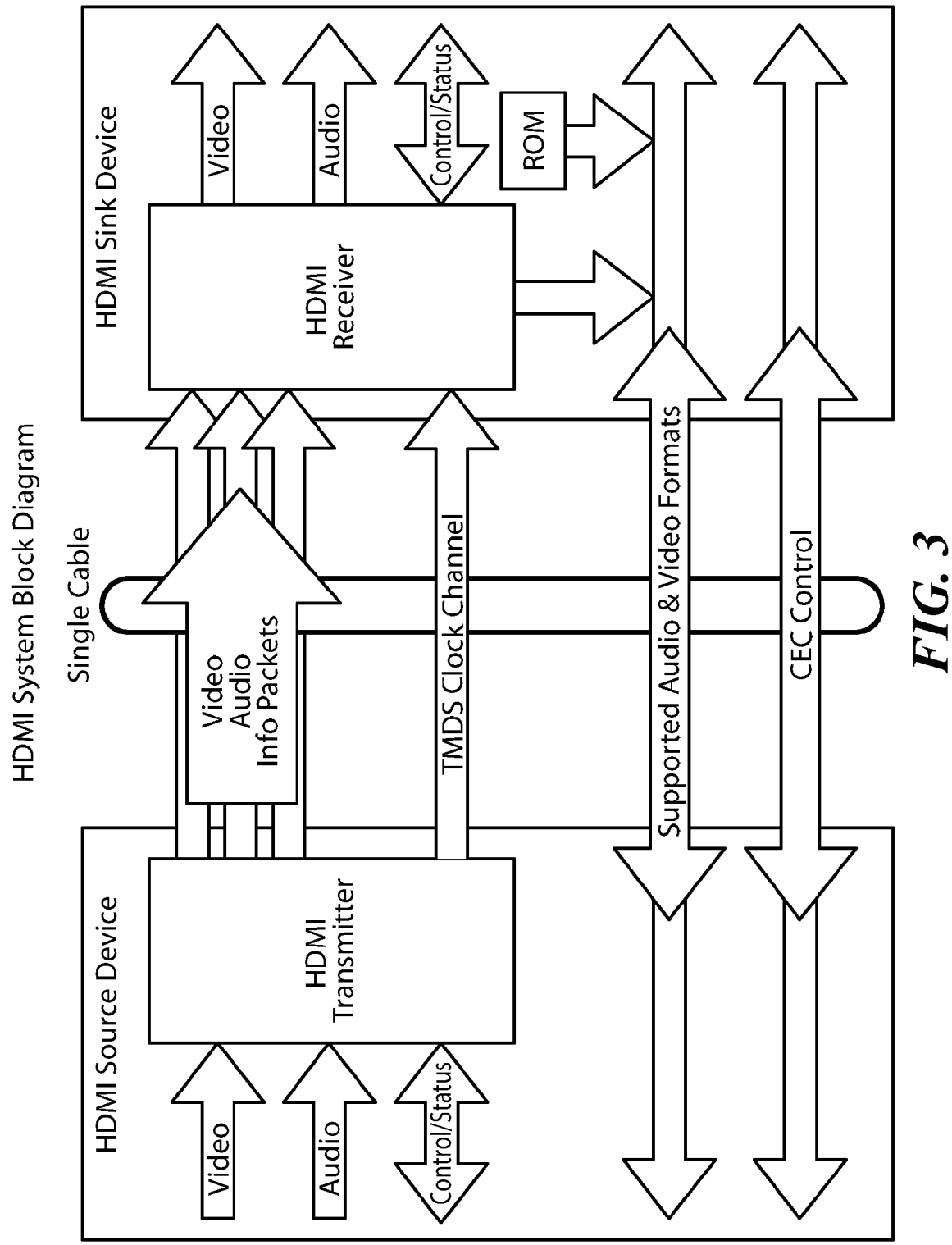
FIG. 3 is a HDMI system block diagram.

FIG. 3 references an exemplary HDMI System Block Diagram, said system transmitting CEC commands over a single cable. The HDMI-compatible device that is transmitting information may be referred to as a HDMI source device, while the HDMI-compatible device receiving the transmitted information is referred to as a HDMI sink device. It can be seen that audio, visual, control, status and CEC control information may be transmitted via one cable in the system. Of course, in a bi-directional system in which information is flowing both directions between various HDMI-compatible devices, such as between a TV and a module, like a STB or SBB, each device will have an HDMI transmitter and HDMI receiver and may be referred to as a source or sink device depending upon whether it is transmitting or receiving information.

HDMI 1.2a, released in December 2005 supports CEC features, command sets, and CEC compliance tests. Using a single cable, CEC control allows a user to control all HDMI devices with a remote control or commander user interface, including powering on or off connected devices, commands initiated by devices to other devices. It thus solves the problem of "too many remote controls." For instance, a user can press play on one HDMI device, such as a DVD, and operation of CEC commands causes the A/V receiver to automatically turn on and switch to the correct input, which in turn automatically turns on the TV, which automatically switches to the correct input received from the A/V receiver; such is an example of "one-touch play."

CEC features, as may be defined from time to time in the CEC Specification, Section 3.1, include one touch play, system audio control, etc. Other, optional features may include one touch recording, deck control, tuner control, On Screen Display (OSD) display, OSD name transfer, device menu control, RC pass-through, power status and vendor-specific commands (such as a vendor remote command). CEC control commands that may be particularly of interest in the communication between a STB (SBB) and TV may include the following: request active source, image view on, text view on, standby, give physical address, get menu language, polling message, report physical address, set menu language, device vendor ID, give device ID, user remote control pressed, user control released, set OSD string, give OSD name, set OSD name, give device power status, report power status, feature abort.

Figure 4:
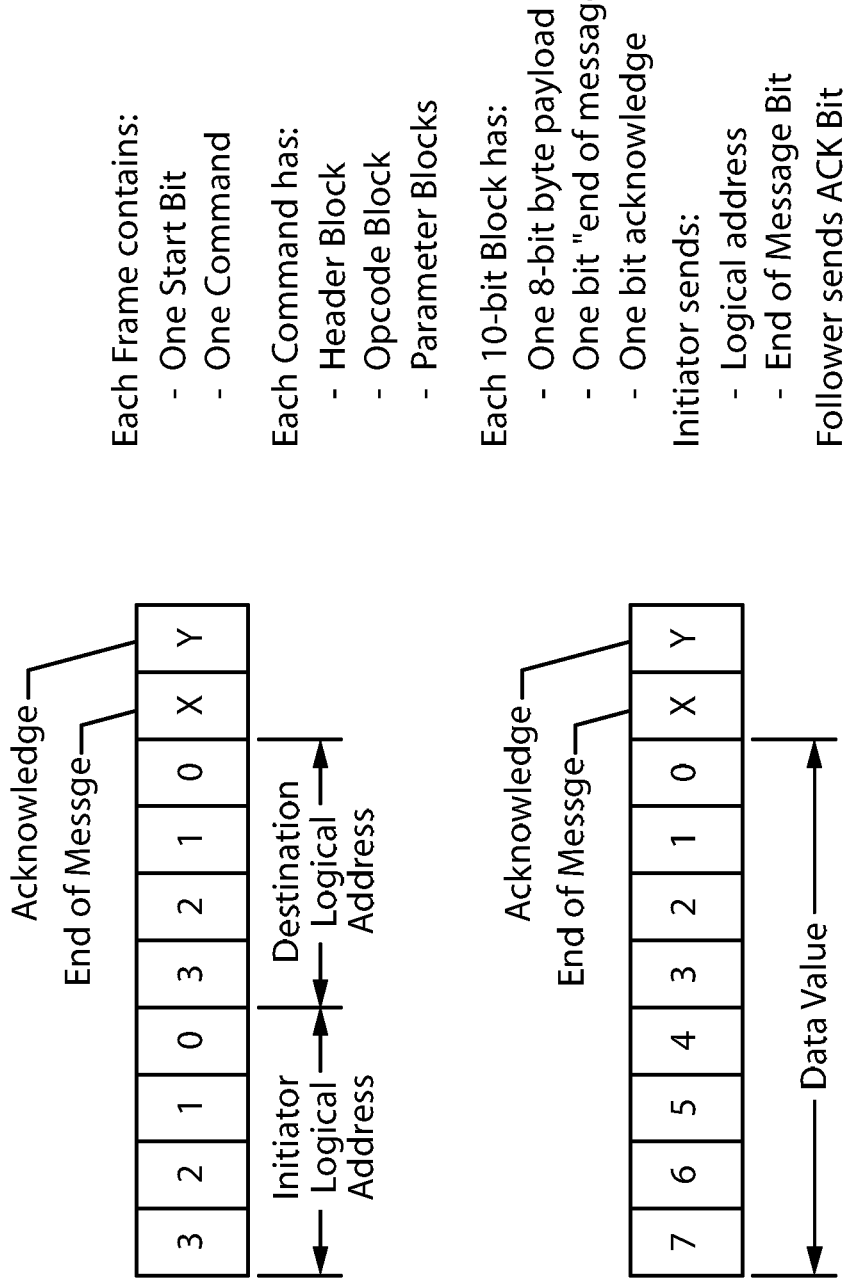
FIG. 4 illustrates a CEC command structure.

Of course, it is understood that the HDMI specification continues to mature, new CEC commands may be expected to be added from time to time as developed. A standard CEC command structure is illustrated in FIG. 4. This structure may remain the same to provide for back-ward compatibility.

As has been described the standard HDMI CEC signal path from device to device is unacceptably slow. This original CEC signal path of the HDMI connector is half duplex and slow, resulting in a sluggish remote control or commander user interface. It is known that certain interfaces are much faster than the standard CEC interface, with USB, USB2 for instance, being able to send and receive information in less time than it takes to just transmit in CEC.

In accordance with certain embodiments, alternate signaling paths are provided for transmission of CEC commands between HDMI-compatible devices, such as between a set-top box (STB), or set-back box (SBB), and a television (TV) or digital television (DTV) in order to provide faster signaling and a better user experience. Whereas the original CEC signal path of the HDMI connector is half duplex and slow, resulting in a sluggish remote control or command user interface, alternate signaling paths are relatively faster and thus can provide a better user experience. Various embodiments in which faster signaling may be achieved will be described, and include different signaling paths that are used instead of or in addition to the normal HDMI CEC connector data path.

Figure 5:
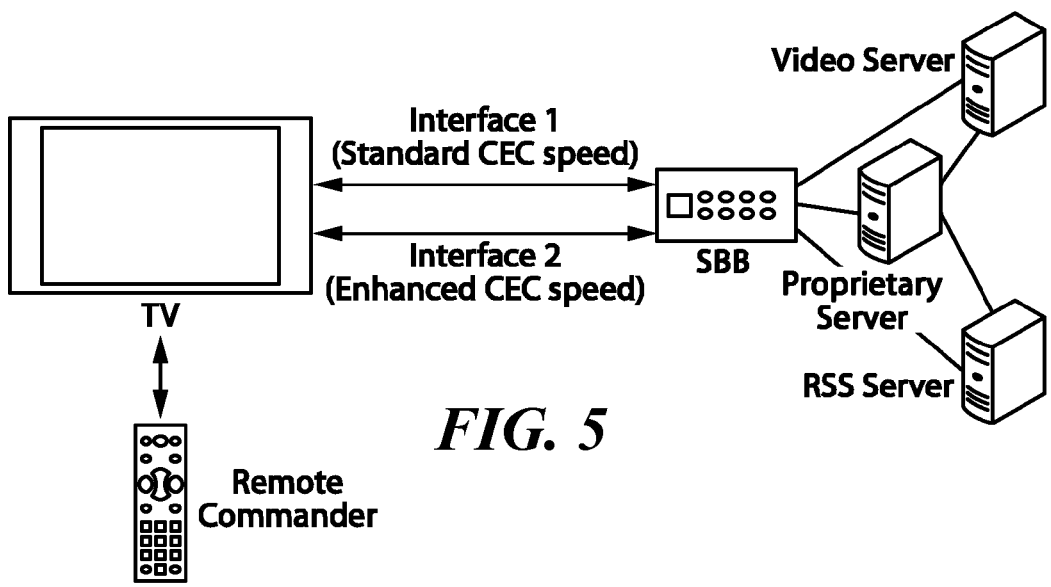
FIG. 5 is a block diagram of an exemplary system capable of enhanced transmission of CEC commands in accordance with certain embodiments.
Figure 6:
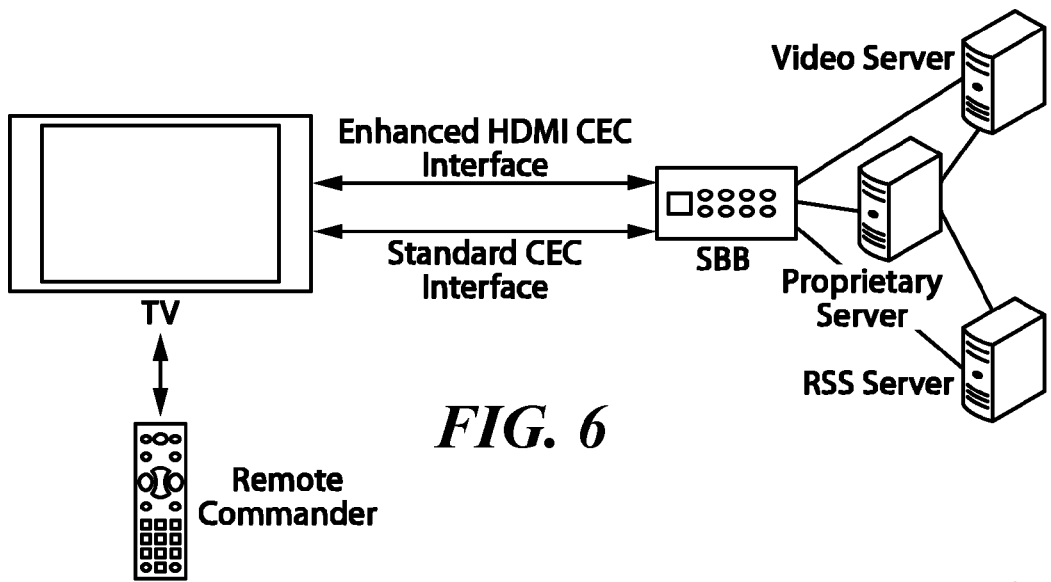
FIG. 6 is a block diagram of an exemplary system capable of transmission of CEC commands using an enhanced HDMI interface in accordance with certain embodiments.
Figure 7:
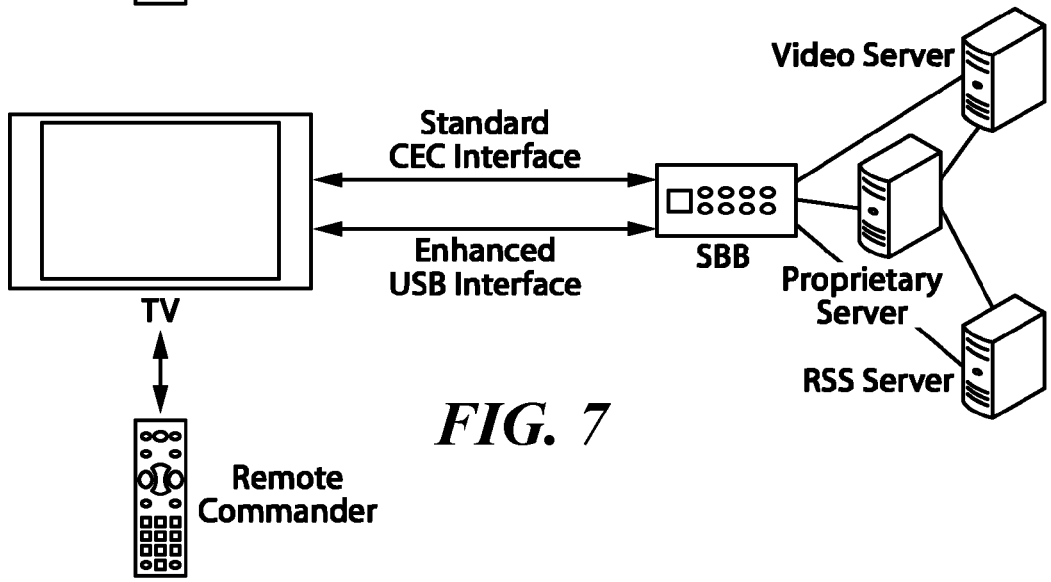
FIG. 7 is a block diagram of an exemplary system capable of transmission of CEC commands using an enhanced USB interface in accordance with certain embodiments.

This is illustrated in FIG. 5, in which an exemplary system diagram, focusing on the transmission of CEC command information between a first HDMI-compatible device, such as a television, and a second HDMI-compatible device, such as a STB or SBB, is shown. In accordance with embodiments of the invention, since it is desirable to transmit CEC command information between devices using a faster, alternate data signal path, there are two communication interfaces or data paths shown. Both Interfaces are capable of transmitting CEC commands but may have differing speed characteristics. Interface 1 may be considered the normal HDMI CEC signal path that is unacceptably slow while Interface 2 is the enhanced, faster data transmission path. As will be described, Interface 2 may rely upon a faster signal path through the HDMI connector, as illustrated in FIG. 6 or it may be based upon another protocol entirely such as USB, as shown in FIG. 7. Moreover, Interface 2 may be used instead of, or in addition to, the original HDMI CEC Interface 1. This is illustrated by the dashed "X" on the standard CEC interface of FIGS. 6 and 7, for example, to indicate that the use of the original, slower standard CEC interface may or may not continue to be used.

Referring again to FIG. 6, the alternate, enhanced data signaling path for transmitting CEC commands between devices envisions an alternate signaling path within the HDMI connector itself Since a HDMI interface will continue to be used, it may not be necessary to connect a separate cable to facilitate these embodiments. In a first embodiment, the I²C data channel of the HDMI connector is used as an alternate path. I²C is a multi-master serial computer bus that may be used to attach peripherals to a motherboard or embedded system and may provide a readily available interface solution for this purpose. I²C may be used in regular or high speed mode in the HDMI connector. As an example, this interface may be used for a proposed High-bandwidth Digital Content Protection (HDCP) key digital rights management (DRM) transaction adapted to transfer CEC traffic. In this embodiment, the original CEC path, shown as the Standard CEC Interface in the figure, may be disabled.

In a second embodiment, an alternate, faster signaling path within the HDMI interface uses a reserved PIN in the HDMI connector, and may be used independently of or in addition to the CEC path. Version A of the HDMI connector specifies that Pin 14, for instance, is a reserved pin. In this instance, the reserved PIN in the HDMI connector may be used as another half-duplex signaling path, and thus this interface may be used independently of or in addition to the CEC path. The set-back module (SBB) and TV can recognize that they have this signaling capability and can switch to using this additional path through the reserved PIN. In this embodiment, the standard CEC interface path may be optionally used. If both interfaces are used, a much improved speed for transmission of CEC commands between the devices may be realized.

In a third embodiment, USB is used as an alternate path for CEC signaling and, as it is not HDMI based, the system will require the use of two cables or interfaces, one HDMI and the other USB. USB is faster than the original CEC path and can thus be used to increase responsiveness to CEC remote control commands. In this embodiment, the original CEC path may be disabled. The same data format used for the CEC interface is used over the USB interface. An exemplary CEC message format over USB might be:

| | |
|---|---|
| 32 bits | length |
| 16 bits | command_id |
| 32 bits | sequence_num |
| 128 bits | CEC_frame |

Where length is the length of the message, command_ID is the ID number that can be used to distinguish the CEC command over USB from other commands over USB, and sequence_num is the number that is numbered sequentially when the command over USB is issued.

CEC frame:
CEC_frame[0] header block (§6 of CEC spec)
CEC_frame[1] Data Block (opcode block)
CEC_frame[2-15] Data Block2 (operand blocks)
Note that EOM and ACK as defined in the CEC specification may be omitted when the CEC command is sent over USB as the other end of the message or an acknowledgement method can be used.

USB, including USB2, is a useful interface for sending a variety of information between devices. For instance, TCIP is established over USB; thus, CEC commands are just one of the commands sent over the USB.

The use of the USB as an alternate path or interface for transmitting CEC commands between two devices requires the use of two physical cables, as previously noted.

The approach chosen can enhance security, making sure that the TV is talking to an approved module, a particular concern when multiple modules might be attached to the TV. Not only may the approach taken enhance security; consumer protection may be enhanced as well. A module can interface to the television using HDMI and USB. In an exemplary embodiment, a television might have as many as four HDMI and USB connectors and it is not uncommon for a user to not properly connect the equipment. Moreover, multiple modules might be attached to the TV.

In accordance with the third embodiment, consider the following. The ability of a module to interface to the TV using both and USB provides a clear advantage. The protocol may be started with either interface, HDMI or USB2, and then continued and/or completed with the other interface. However, there are security and customer concerns with multiple input systems. A hacker may probe the USB interface using a PC but not drive signals on the HDMI connector. Obviously the greater the number of modules attached to the TV, the greater the concern about hacking. In addition to this security concern, consider that a mis-wiring has occurred, a common occurrence when there are many possible ways to connect components such as when multiple modules might be attached to a TV.

Figure 8:
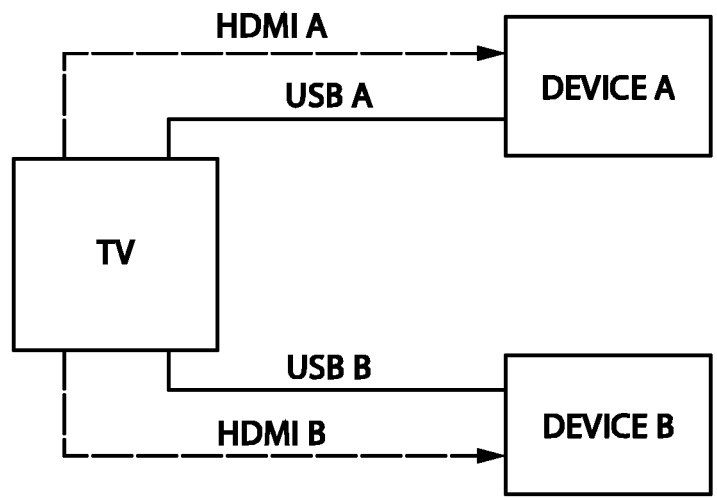
FIG. 8 is an exemplary system having a TV and two module devices in accordance with certain embodiments.

Refer to FIG. 8, in which an exemplary system having a TV and two module devices Device A and Device B is illustrated. It is necessary to determine whether the HDMI A and USB A interface signaling paths are connected to Device A. If Device A sends the information that is acquired from interface HDMI A, then the TV can determine that interface USB A is connected to Device A. The physical address is the information that is acquired from the HDMI connection, HDMI A. Suppose that Device A gets physical address 1.0.0.0. from HDMI A connection and sends that address 1.0.0.0. over USB A to the TV. The TV can know that the USB A is connected to Device A. Similarly, the Device B gets physical address 2.0.0.0. from HDMI B connection and sends 2.0.0.0. from the HDMI B connection and sends 1.0.0.0. over interface USB B. The TV knows that the USB B is connected to Device B.

It can be seen that this form of authentication, using physical addresses, overcomes concerns associated with multiple device and multiple interface systems. Both security and consumer protection concerns are addressed.

In order to address these concerns the migration or switching of transmission of a protocol such as CEC commands from the CEC interface to an alternative physical layer or interface such as a reserved pin, I²C bus, or even USB, may also occur after authentication of the two devices if desired. Authentication of a device, such as a module, ensures that it is permitted to be talking to the other device of interest, such as the TV. As it is envisioned that a TV may not know which devices or modules are authorized to interface with it, authentication addresses this issue. As it is entirely conceivable that a TV may not know whether a module is connected to it, authentication discovers such problems so they can be remedied. Moreover, authentication provides a mechanism of exercising control of which devices will be authorized to use the communication path. Non-authorized devices may be precluded from operating in the transmission of CEC commands in the enhanced manner provided herein.

This would allow enhanced devices capable of starting transmission of a protocol using a first interface and then continuing or completing transmission of the protocol with a second interface to operate amongst non-enhanced devices. Once enhanced devices authenticate each other, they may negotiate the migration of the CEC commands to an alternative physical layer or interface that both devices have in common so that a faster, more efficient transmission of the protocol is realized.

Figure 9:
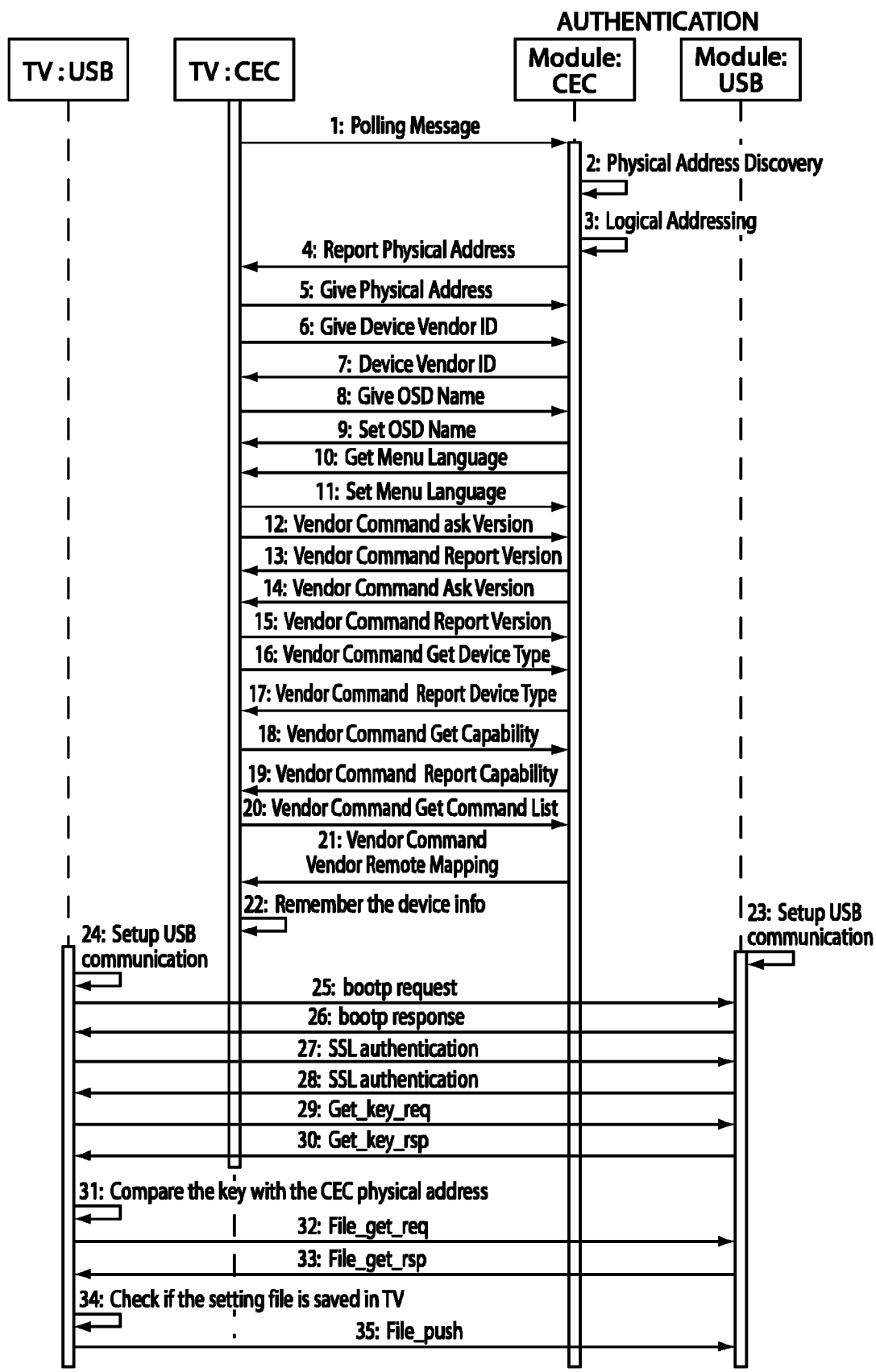
FIG. 9 is a sequence diagram illustrating transition of CEC command transmission from a first to a second interface in accordance with certain embodiments.

Referring to the sequence diagram of FIG. 9, consider an example in which several commands that may be used for authentication purposes are illustrated. It is noted that not all the commands are necessary for authentication, as varying degrees of security may be desired. Moreover, the sequence diagram of the figure is in the context of switching from the standard HDMI CEC interface to an alternate USB interface.

However, it is understood that a similar might be undertaken for any of the other embodiments described herein. Finally, the sequence diagram illustrates a TV and a module, such as a STB or a SBB, as the two devices, but, again, it is within the scope of the present invention to undertake a similar authentication process for other HDMI-compatible devices.

The TV starts this sequence on bootup or when the TV recognizes that the device is attached. If the module is connected before the TV boot, the module will be recognized. At 1, the TV sends a polling message via the standard CEC interface to the module. At 2 and 3, the physical address and the logical addressing of the SBB are ascertained. At 4, the module can report its physical address to the TV and may provide this without first receiving the physical address of the TV at 5. If USB insertion is detected, then the TV gives its physical address to the module at 5, in preparation for possible migration from the standard CEC interface to a USB alternate interface. The exchange of physical addresses of the devices is one mechanism by which confirmation and also authentication may occur, as has been described.

At 6, the TV communicates its device vendor ID to the module via the standard CEC interface and the module provides this information to the TV, also over the standard CEC interface, at 7 as shown. This vendor ID information from the module, along with the physical address information given previously, is used to determine whether the module is permitted to communicate with the TV once the migration to the alternate USB interface is fade or even at all, although in this example it is not yet used. For instance, the TV, upon receiving a vendor ID from the module that does not match its own vendor ID, may make the determination that the module is not authenticated, because the TV will operate only with modules of a particular vendor, and at the right time, it will not engage in communication with the module over the alternate, faster interface.

At 8, 9, 10, and 11 OSD name and menu language information may be optionally exchanged, but such is not required for authentication to occur. 10, the get language command, for instance, may not occur in certain environments. However, such information can be used in the authentication process. For example, if the required OSD name, such as a Sony ID, is not returned by the module at 9, then the authentication would fail and the process stops.

Commands 12-21 center on vendor commands as shown. For 12, the version of the module is asked because if there is not acknowledge (ack) or feature abort returned from the module at 13, it may indicate that the device has only generic, standard CEC interface capability or it is not a SBB, as required, for instance, and thus the device cannot be authenticated in this example. Similar information might be gleaned from the device type inquires of 16, 17, and the capability inquires of 18, 19. Command 20 may not be asked if the USB bit is set on the report capability response received in 19. Furthermore, if the USB bit is not set on the report capability response of 19, then the inquiry could stop at 21.

At 22, all the device information exchanged between the TV and the module are collected for action. At 23 and 24, assuming that there have been no responses from the SBB module that disqualified if from authentication, then USB communication for both the module and for the TV, respectively, is setup as shown.

Following, setup for migration to the alternate, USB interface, bootup request and response is handled at 25 and 26. Encryption is provided such as, for example, by the SSL authentication at 27 and 28, whereby CEC commands thereafter are encrypted. Secure Sockets Layer (SSL) is just one example of a cryptographic protocol that can be used to secure communications on the Internet for data transfers for such things as web browsing, email, and instant messaging.

At 29 and 30, the TV requests a key from the module. At 31, this key is compared with the physical address earlier provided by the module at 4 and 5. If there is not a match, this may indicate that the module is not authorized for enhanced communication with the TV and authentication may accordingly be denied. If there is a match, then transmission of CEC protocol commands from the first, slower CEC interface to the second, faster USB interface can proceed.

Alternately, the TV may have its own key and authentication may be performed by verifying that the key returned by each device to the other is the one expected. In a particular example, authentication is completed upon both devices returning the same key to each other; if the keys match, then transmission of CEC protocol commands from the first, slower CEC interface to the second, faster USB interface can proceed. If different keys are returned, then authentication between the two devices is rejected and transmission of the CEC commands will not be migrated to a better, faster interface. In certain embodiments, the TV will be the device to reject the migration if the keys differ, as is the case in this example in which the TV initiated the key inquiry to the SBB module. Authentication of a module can be achieved during boot up or when module discovery is initiated upon plugging in the module or when initiated by the user through the user interface (UI). The available modules and their types may be displayed on the screen of the TV user interface and only desired or authorized modules, such as a Sony SBB having the ability to switch from the CEC to an alternate interface, would be displayed on the screen for selection by the user.

It can be seen that the physical addresses and keys of the devices, TV and SBB in this example, may be used during authentication to verify these devices, one to the other, prior to commencing transmission of CEC commands over the CEC interface, which as previously mentioned, is a relatively slow interface.

Upon authentication, transmission of CEC commands between the devices will be effected over the faster, alternate path, USB in this example. For instance, in order to keep the quality of the user experience high with the TV, the TV does not filter remote control commands; instead, the TV forwards the remote control command to the device over the faster path.

The CEC interface cable may not be used during this time to transmit CEC commands, although the CEC cable can still be used to send other information, such as non-CEC commands, like application launch commands, and audio and visual information. In this case, the use of the standard CEC cable to transmit non-CEC commands allows the order in which such commands are transmitted to be known and therefore controlled.

It is to be noted that as part of authentication, additional information, such as a device identification number, may be used to verify that a device is an authorized device and thus control which devices have access to a faster communication path for CEC command protocol information. As a further example, upon initiating communication, a device might be requested to transmit an expected copyright notice across the USB interface. In order to start transmission of CEC commands via the USB path, the copyright notice must be present and verified.

Optionally, cryptography or encryption techniques, in addition to or instead of the SSL authentication discussed above, such as a Public Key approach, might be used to verify authorized devices and stop rogue devices. In both secret key and public key approaches, the TV device could send a random number, such as 128 bits, in the Auth_bytes command to the module. In the response, the module sends back an encrypted value in the Auth-status field. In the secret key case, there may be a shared secret value which is used to encrypt the random number. The size of the encrypted value is also 128 bits. The TV decrypts the value with the shared secret value to see if it matches the original clear value of the random number that was sent earlier.

In the public key case, the response also includes the certificate for the module. The TV may check the certificate for authenticity using a root Certificate Authority public key. (It can do this once and record the fact that it has seen this certificate before.) It then uses the public key in the certificate to decrypt the encrypted value. It then verifies that it got the same random value back. The certificate has it own length field so that the TV knows how to parse the Auth_status to get the certificate and then what is left is the encrypted random number. The random value may continually change so that this protocol is immune to replay attacks.

A note on authentication with regard to use of the known, standard CEC interface versus the use of USB as a faster, alternate signaling path for transmission of CEC commands is in order. Since with authentication, the devices (TV and module) authenticate each other at the beginning of communication, the data is sent to the trusted (authenticated) device. In this case, it is assumed that the data is transferred to the trusted device and data protection or encryption is not performed for the transaction over the standard CEC path. Since data over the standard CEC is not sensitive, data is not encrypted over CEC.

Data over the USB interface, on the other hand, should be secured. This may be provided by a root certificate, for example, which will be issued by an authorized entity, that will be used to issue and sign TV and SBB's certificates. The certificate may be issued on a model basis, not per device. The certificate would be saved in a secure area of the device, and could be managed and/or configured by those having the proper clearance.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for establishing faster transmission of Consumer Electronic Control (CEC) commands between first and second HDMI-compatible devices, comprising:
    the first HDMI-compatible device providing to the second HDMI-compatible device a device identifier that identifies the first HDMI-compatible device to the second HDMI-compatible device;
    the second HDMI-compatible device receiving the device identifier from the first HDMI-compatible device;
    confirming that the first and second devices share an alternate interface for transmitting CEC commands, wherein the alternate interface is a signaling path distinct from a standard HDMI CEC interface between the first and second devices; and
    transmitting CEC commands between the first and second devices over the alternate interface.

2. The method of claim 1, wherein confirming further comprises:
    authenticating that said second device is permitted to be in communication with said first device.

3. The method of claim 2, wherein said first device is a TV and said second device is a module and authenticating the module only occurs if the module is permitted to be used with the TV.

4. The method of claim 3, further comprising:
    displaying the module to a user of the TV for selection from a plurality of authenticated modules only if the module is authenticated.

5. The method of claim 4, wherein displaying to the user is part of a TV menu displayed to the user.

6. The method of claim 3, further comprising:
    not authenticating the module for use with the TV if a key returned from the module to the TV does not reflect a physical address provided by the module to the TV.

7. The method of claim 3, further comprising:
    not authenticating the module for use with the TV if a vendor identification of the module is not expected by the TV.

8. The method of claim 1, wherein confirming that the first and second devices share the alternate interface fails if a physical address cannot be provided by either of said first and second devices.

9. A method for establishing faster transmission of Consumer Electronic Control (CEC) commands between first and second HDMI-compatible devices, comprising:
the first HDMI-compatible device providing to the second HDMI-compatible device a device identifier that identifies the first HDMI-compatible device to the second HDMI-compatible device;
the second HDMI-compatible device receiving the device identifier from the first HDMI-compatible device;
transmitting CEC commands between the first and second devices over a standard HDMI CEC interface;
confirming that the first and second devices share an alternate interface for transmitting CEC commands;
transmitting CEC commands between the first and second devices over the alternate interface,
wherein the alternate interface is a signaling path distinct from and faster than the standard HDMI CEC interface at transmitting CEC commands.

10. The method of claim 9, wherein the first device is a television and the second device is a set-top box.

11. The method of claim 9, wherein the alternate interface is an alternate signaling path within a HDMI connector connecting said first and second devices.

12. The method of claim 11, wherein the alternate signaling path within the HDMI connector is an $I^2C$ data channel of the HDMI connector.

13. The method of claim 12, further comprising:
after confirming that the first and second device share the alternate interface and then transmitting CEC commands using the alternate interface, no longer transmitting CEC commands between first and second devices over the standard HDMI CEC interface.

14. The method of claim 11, wherein the alternate signaling path within the HDMI connector is a reserved PIN in the HDMI connector.

15. The method of claim 9, further comprising, transmitting CEC commands between said first and second devices using both the standard HDMI CEC interface and the alternate interface.

16. The method of claim 9, wherein the alternate interface uses USB.

17. The method of claim 16, further comprising: after confirming that the first and second device share the alternate interface and then transmitting CEC commands using the alternate interface, no longer transmitting CEC commands between first and second devices over the standard HDMI CEC interface.

18. A method for establishing faster transmission of Consumer Electronic Control (CEC) commands between a module and a television device, comprising:
the first HDMI-compatible device providing to the second HDMI-compatible device a device identifier that identifies the first HDMI-compatible device to the second HDMI-compatible device;
the second HDMI-compatible device receiving the device identifier from the first HDMI-compatible device;
confirming that the module and the television share an alternate interface for transmitting CEC commands, wherein the alternate interface is a signaling path distinct from a standard HDMI CEC interface between said module and television;
transmitting CEC commands between said module and television over the alternate interface.

19. The method of claim 18, wherein the module is one or more of a set-top box, a set-back box, a DVD player, a PC, a video game system, and an A/V receiver.

20. A module operable to interface with a television in an audio/visual system, comprising:
a programmed processor;
a software segment running on the programmed processor;
a user interface software segment running on the programmed processor that receives user commands using the software segment; and
a connector element,
where the processor is configured to transmit a device identifier that identifies the module as a first HDMI-compatible device to a second HDMI-compatible device;
wherein the module is operable to transmit CEC commands using an alternate interface coupled to the connector element and wherein the alternate interface is a signaling path distinct from a standard HDMI CEC interface.

21. The module of claim 20, wherein authentication of the module is performed with the programmed processor in communication with a device to which the CEC commands are to be transmitted over the alternate interface.

22. The module of claim 21, wherein the module is not authenticated and thus cannot transmit CEC commands to the device over the alternate interface if a physical address of the module is not compatible with a key of the device.

23. The module of claim 21, wherein the module is not authenticated and thus cannot use the alternate interface to send CEC commands to the device if a vendor identification of the module is rejected by the device.

24. The module of claim 21, wherein the module cannot transmit CEC commands to the device using the alternate interface if it cannot supply a physical address to the device.

25. The module of claim 20, wherein the module is one or more of a set-top box, a set-back box, a DVD player, a PC, a video game system, and an A/V receiver and the device is a television.

26. A method for establishing faster transmission of Consumer Electronic Control (CEC) commands between first and second HDMI-compatible devices, comprising:
determining that an HDMI connector having a standard HDMI CEC interface and an $I^2C$ data channel interface is coupled to the first and second HDMI-compatible devices, comprising:
the first HDMI-compatible device providing to the second HDMI-compatible device over the $I^2C$ data channel interface a device identifier that identifies the first HDMI-compatible device to the second HDMI-compatible device, wherein the device identifier is acquired by the first HDMI-compatible device from the second HDMI-compatible device over the standard HDMI CEC interface of the HDMI connector; and
the second HDMI-compatible device receiving the device identifier from the first HDMI-compatible device and using the received device identifier to determine that the HDMI connector is coupled to the first HDMI-compatible device; and
transmitting CEC commands between the first and second HDMI-compatible devices over the $I^2C$ data channel of the HDMI connector, wherein the $I^2C$ data channel is an interface between the first and second HDMI-compatible devices of the HDMI connector that is separate from the standard HDMI CEC interface and faster than the HDMI connector than the standard HDMI CEC interface.

27. The method of claim 26, Wherein the first HDMI-compatible device is a module and the second HDMI-compatible device is a television and wherein the device identifier is a physical address of the module provided by the module to the television over the I²C data channel interface in response to receiving a polling message from the television over the standard HDMI CEC interface.

28. A method for establishing faster transmission of Consumer Electronic Control (CEC) commands between first and second HDMI-compatible devices, comprising:
   determining that the first and second HDMI-compatible devices share a first communication interface of a HDMI connector that is capable of transmitting CEC commands between the first and second HDMI-compatible devices at a first speed and share a second communication interface of the HDMI connector that is capable of transmitting CEC commands between the first and second HDMI-compatible devices at a second speed that is faster than the first speed of the first communication interface, wherein the first communication interface of the HDMI connector is a standard HDMI CEC interface separate from the second communication interface of the HDMI connector, comprising:
   the first HDMI-compatible device providing to the second HDMI-compatible device over the second communication interface of the HDMI connector a device identifier that identifies the first HDMI-compatible device to the second HDMI-compatible device, wherein the device identifier is acquired by the first HDMI-compatible device from the second HDMI-compatible device over the standard HDMI CEC interface of the HDMI connector; and
   the second HDMI-compatible device receiving the device identifier from the first HDMI-compatible device and using the received device identifier to determine that the HDMI connector is coupled to the first HDMI-compatible device; and
   transmitting CEC commands between the first and second HDMI-compatible devices over at least one of the standard HDMI CEC interface and the second communication interface of the HDMI connector.

29. The method of claim 28, wherein the first HDMI-compatible device is a module and the second HDMI-compatible device is a television and wherein the device identifier is a module identifier of the module provided by the module to the television over the second communication interface in response to receiving a polling message from the television over the standard HDMI CEC interface.

30. The method of claim 29, wherein the second communication interface of the HDMI connector is an I²C data channel of the HDMI connector.

31. The method of claim 30, wherein the I²C data channel of the HDMI connector uses a high-bandwidth Digital Content Protection (HDCP) key digital rights management (DRM) transaction to transmit the CEC commands between the first and second HDMI-compatible devices.

32. The method of claim 29, wherein the second communication interface of the HDMI connector is a reserved PIN of the HDMI connector.

33. The method of claim 32, wherein the reserved PIN of the HDMI connector and the standard HDMI CEC interface are both half-duplex interfaces for transmitting CEC commands.

34. The method of claim 33, further comprising:
   transmitting CEC commands using both the reserved PIN and the standard HDMI CEC interface of the HDMI connector.

35. A method for establishing faster transmission of Consumer Electronic Control (CEC) commands between first and second HDMI-compatible devices, comprising:
   determining that the first and second HDMI-compatible devices share a first communication interface capable of transmitting CEC commands between the first and second HDMI-compatible devices at a first speed, wherein the first communication interface is a standard HDMI CEC interface of a HDMI connector;
   determining that the first and second HDMI-compatible devices share a second communication interface capable of transmitting CEC commands between the first and second HDMI-compatible devices at a second speed that is faster than the first speed of the standard HDMI CEC interface, wherein the second communication interface is a USB interface of a non-HDMI connector between the first and second HDMI-compatible devices; and
   transmitting CEC commands between the first and second HDMI-compatible devices over at least one of the standard HDMI CEC interface and the USB interface of the non-HDMI connector, wherein transmission of CEC commands over the USB interface is accomplished using a CEC data format.

36. The method of claim 35, further comprising:
   disabling the standard HDMI CEC interface.

37. The method of claim 35, wherein the CEC data format does not include End of Message (EOM) and Acknowledge (ACK) information.

38. The method of claim 35, wherein determining that the first and second HDMI-compatible devices share the standard HDMI CEC interface of the HDMI connector and the USB interface of the non-HDMI connector further comprises:
   the first HDMI-compatible device providing to the second HDMI-compatible device over the USB interface of the HDMI connector a device identifier that identifies the first HDMI-compatible device to the second HDMI-compatible device, wherein the device identifier is acquired by the first HDMI-compatible device from the second HDMI-compatible device over the standard HDMI CEC interface of the HDMI connector; and
   the second HDMI-compatible device receiving the device identifier from the first HDMI-compatible device and using the received device identifier to determine that the USB interface is coupled to the first HDMI-compatible device.

39. The method of claim 35, wherein the first HDMI-compatible device is a module and the second HDMI-compatible device is a television.

40. A module operable to interface with a television in an audio/visual system, comprising:
   a programmed processor;
   a software segment running on the programmed processor;
   a user interface software segment running on the programmed processor that receives user commands using the software segment; and
   a connector element,
   wherein the module is operable to receive a module identifier over the standard HDMI CEC interface of the connector element from the television and in response to receiving a polling message over the standard HDMI CEC interface from the television the module is operable to transmit the module identifier over a second communication interface of the connector element that is separate from and faster than the standard HDMI CEC interface;

wherein further to transmission of the module identifier over the second communication interface distinct from the standard HDMI CEC interface, the module is operable to transmit CEC commands to and from the television over at least one of the standard HDMI CEC interface shared by the module and the television and the second communication interface shared by the module and television.

41. The module of claim 40, wherein the connector element comprises a HDMI connector and the standard HDMI CEC interface and the second communication interface are both of the HDMI connector.

42. The module of claim 41, wherein the second communication interface is a I²C data channel of the HDMI connector.

43. The module of claim 41, wherein the second communication interface is a reserved PIN of the HDMI connector.

44. The module of claim 40, wherein the connector element further comprises a HDMI connector that has the standard HDMI CEC interface and a non-DHMI connector that has a USB interface as the second communication interface.

* * * * *